US012736901B2

(12) United States Patent
Watatani et al.

(10) Patent No.: US 12,736,901 B2
(45) Date of Patent: Sep. 15, 2026

(54) FIXING DEVICE AND IMAGE FORMING APPARATUS IN WHICH MOVEMENT OF SENSOR HOLDING MEMBER RELATIVE TO HEATER HOLDING MEMBER IS RESTRICTED BY SENSOR HOLDING MEMBER BEING ENGAGED WITH HEATER HOLDING MEMBER

(71) Applicant: KYOCERA Document Solutions Inc., Osaka (JP)

(72) Inventors: Tomohiro Watatani, Osaka (JP); Masakazu Uehara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/053,726

(22) Filed: Feb. 14, 2025

(65) Prior Publication Data

US 2025/0264829 A1 Aug. 21, 2025

(30) Foreign Application Priority Data

Feb. 19, 2024 (JP) ................................ 2024-023265

(51) Int. Cl.
*G03G 15/20* (2006.01)

(52) U.S. Cl.
CPC ..... *G03G 15/2017* (2013.01); *G03G 15/2039* (2013.01); *G03G 15/2053* (2013.01); *G03G 15/2064* (2013.01); *G03G 2215/2035* (2013.01)

(58) Field of Classification Search
CPC ........... G03G 15/2017; G03G 15/2039; G03G 15/2042; G03G 15/2053; G03G 15/2064; G03G 2215/2003
See application file for complete search history.

(56) References Cited

U.S. PATENT DOCUMENTS

| | | | | |
|---|---|---|---|---|
| 10,795,294 | B2 | 10/2020 | Tanto | |
| 2017/0308009 | A1* | 10/2017 | Mochizuki | G03G 15/2039 |
| 2020/0183310 | A1* | 6/2020 | Tanto | G03G 15/2053 |
| 2020/0201218 | A1 | 6/2020 | Watatani et al. | |
| 2020/0201219 | A1 | 6/2020 | Uehara et al. | |
| 2023/0034177 | A1* | 2/2023 | Kohama | G03G 15/2039 |

FOREIGN PATENT DOCUMENTS

| | | |
|---|---|---|
| JP | 2004163465 A | 6/2004 |

* cited by examiner

*Primary Examiner* — Carla J Therrien
(74) *Attorney, Agent, or Firm* — IP Business Solutions, LLC.

(57) ABSTRACT

A fixing device includes a fixing belt, a heating device, and a pressurizing member. The heating device includes a heater holding member, a temperature sensor that faces a heater and is disposed in the heater holding member, and a sensor holding member that is assembled with the heater holding member in a direction of facing the temperature sensor and includes a biasing member that biases the temperature sensor. The heater holding member includes a locking portion that locks one end of the sensor holding member, and an engaged portion engaged with an engaging portion provided in the sensor holding member at a different position from the one end in a length direction of the sensor holding member when the sensor holding member moves in the length direction with the one end locked by the locking portion, the engaging portion receiving the sensor holding member pressed by a counterreaction of biasing.

4 Claims, 10 Drawing Sheets

FIXING DEVICE AND IMAGE FORMING APPARATUS IN WHICH MOVEMENT OF SENSOR HOLDING MEMBER RELATIVE TO HEATER HOLDING MEMBER IS RESTRICTED BY SENSOR HOLDING MEMBER BEING ENGAGED WITH HEATER HOLDING MEMBER

INCORPORATION BY REFERENCE

This application claims priority to Japanese Patent Application No. 2024-023265 filed on 19 Feb. 2024, the entire contents of which are incorporated by reference herein.

BACKGROUND

The present disclosure relates to a fixing device that fixes an image formed on a recording medium through thermal press-bonding and an image forming apparatus including the fixing device.

Typical image forming apparatuses such as copy machines and multifunction machines include, for example, fixing devices that fix images formed on recording media. Such a fixing device includes a tubular and rotatable fixing belt, a heating device, and a pressurizing member. The heating device includes a heater that heats the fixing belt and faces an inner peripheral surface of the fixing belt.

The pressurizing member sandwiches the fixing belt between the pressurizing member itself and the heater, forms a fixing nip portion, in which a recording medium is sandwiched and transported, between the pressurizing member and the fixing belt, and causes the fixing belt to be driven and rotated. The fixing device causes an image formed on the recording medium to be fixed on the recording medium through heating and pressurization (thermal press-bonding) by the fixing nip portion.

Also, the fixing device is typically provided with a temperature sensor that detects a temperature of the heater in order to maintain the temperature of the fixing belt or the like at an appropriate temperature.

SUMMARY

As an aspect of the present disclosure, a technology achieved by further improving the above technology will be proposed.

A fixing device according to an aspect of the present disclosure includes a tubular and rotatable fixing belt, a heating device, and a pressurizing member. The heating device includes a heater that heats the fixing belt and faces an inner peripheral surface of the fixing belt. The pressurizing member sandwiches the fixing belt with the heater, forms a fixing nip portion, in which a recording medium is sandwiched and transported, between the pressurizing member and the fixing belt, and causes the fixing belt to be driven and rotated. The heating device includes a heater holding member, a temperature sensor, and a sensor holding member. The heater holding member holds a heater. The temperature sensor faces the heater and is disposed in the heater holding member. The sensor holding member is assembled with the heater holding member in which the temperature sensor is disposed in a direction in which the sensor holding member faces the temperature sensor. The sensor holding member includes a biasing member. The biasing member faces the heater holding member via the temperature sensor and biases the temperature sensor in a direction directed from the temperature sensor to the heater. The heater holding member includes a locking portion and an engaged portion. The locking portion locks one end of the sensor holding member. The engaged portion is engaged with an engaging portion provided in the sensor holding member at a position different from a position of one end of the sensor holding member in a length direction of the sensor holding member when the sensor holding member moves in the length direction in a state where the one end is locked by the locking portion, and receives, by the engaging portion, the sensor holding member pressed by a counter reaction of the biasing performed by the biasing member on the temperature sensor.

An image forming apparatus according to another aspect of the present disclosure includes the aforementioned fixing device and an image forming device. The image forming device forms an image on a recording medium. The fixing device causes the image formed on the recording medium by the image forming device to be fixed.

DETAILED DESCRIPTION

Figure 1:
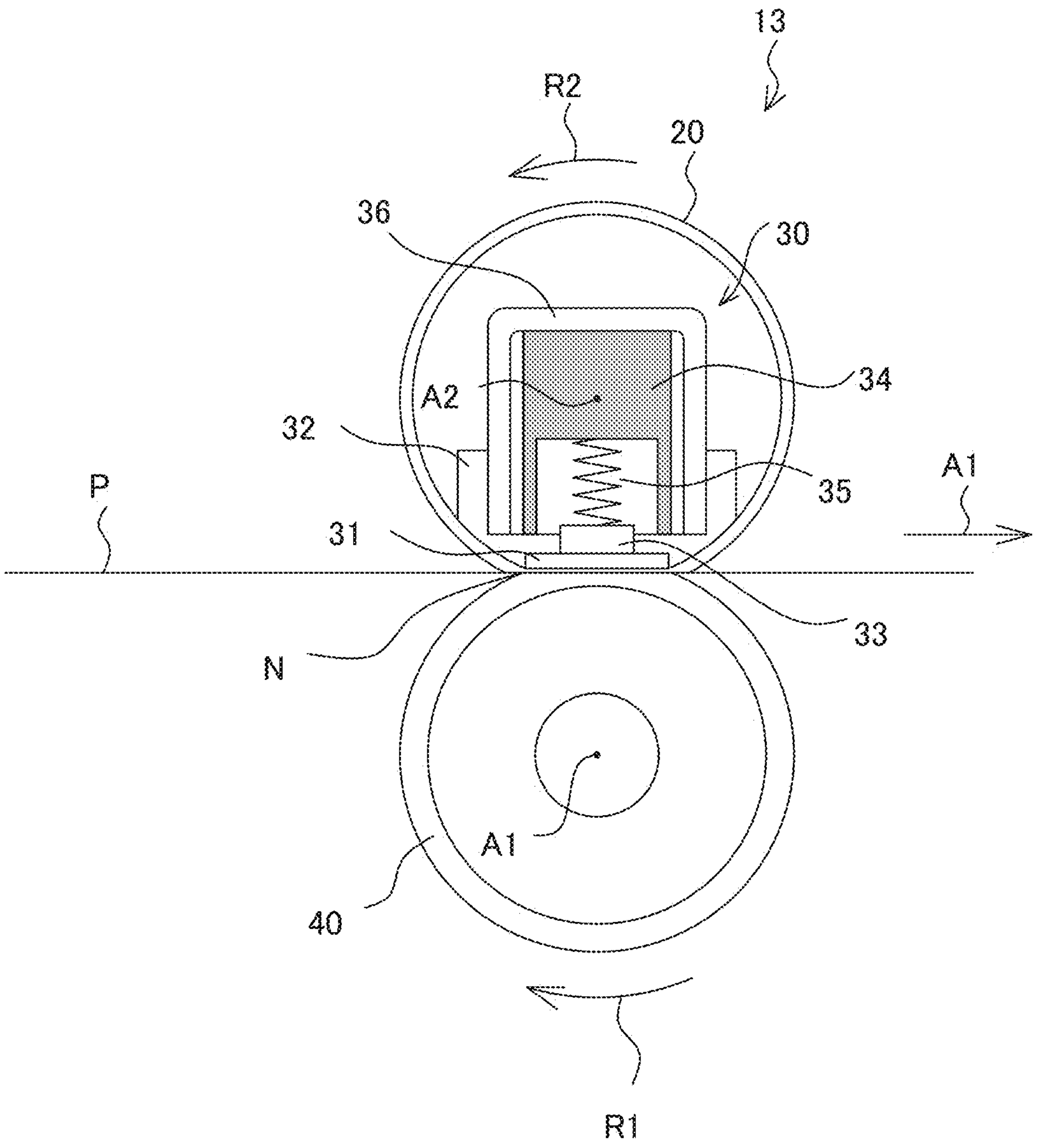
FIG. 1 is a sectional view schematically illustrating an example of a fixing device according to an embodiment of the present disclosure.

Hereinafter, a fixing device and an image forming apparatus according to an embodiment of the present disclosure will be described with reference to the drawings. FIG. 1 is a sectional view schematically illustrating an example of a fixing device 13 according to an embodiment of the present disclosure.

The fixing device 13 causes a toner image to be fixed on recording paper through thermal press-bonding. The fixing device 13 includes a fixing belt 20, a heating device 30 facing an inner peripheral surface of the fixing belt 20, and a pressurizing member 40. The fixing belt 20 is a tubular and rotatable belt. The pressurizing member 40 rotates in a first rotation direction R1 (the clockwise direction in FIG. 1) around a first rotation axis A1 (a direction perpendicularly intersecting the paper surface of FIG. 1) as an axial center. The fixing belt 20 is driven by the rotation of the pressurizing member 40 and rotates in a second rotation direction R2 (the counterclockwise direction in FIG. 1) around a second rotation axis A2 extending parallel to the first rotation axis A1 as an axial center.

When a recording paper P is sandwiched and transported by the fixing nip portion N formed by the fixing belt 20 and the pressurizing member 40, an unfixed toner image is melted by heat of the heating device 30, and the melted toner image is fixed to the recording paper P with a pressure of the pressurizing member 40 in pressure contact with the fixing belt 20. A1 in the drawing indicates a transport direction of the recording paper P.

The heating device 30 includes a heater 31, a heater holding member 32, a temperature sensor 33, a sensor holding member 34, a biasing member 35, and a reinforcing member 36.

The heater 31 heats the fixing belt 20. The heater 31 is a surface-shaped heater extending along the direction of the second rotation axis A2 (the paper surface depth direction in FIG. 1) of the fixing belt 20. The heater 31 is disposed on the inner side of the fixing belt 20 and faces an inner peripheral surface of the fixing belt 20. The heater 31 is, for example, a ceramic heater.

The heater holding member 32 holds the heater 31. The heater holding member 32 is a heat-resistant resin member with a U-shaped section extending along the direction of the second rotation axis A2.

The temperature sensor 33 is disposed in the heater holding member 32 to face the heater 31. The temperature sensor 33 is inserted into a through-hole formed in the heater holding member 32 and is in contact with the heater 31. The temperature sensor 33 is, for example, a thermistor.

The sensor holding member 34 holds the temperature sensor 33. The sensor holding member 34 faces the heater holding member 32 via the temperature sensor 33. The sensor holding member 34 includes the biasing member 35. The sensor holding member 34 is a heat-resistant resin member extending along a longitudinal direction of the heater holding member 32. The sensor holding member 34 is assembled with the heater holding member 32 where the temperature sensor 33 is disposed in a direction in which the sensor holding member 34 faces the temperature sensor 33.

The biasing member 35 is, for example, a compression spring made of a coil spring. The biasing member 35 biases the temperature sensor 33 in a direction directed from the temperature sensor 33 to the heater 31.

The reinforcing member 36 reinforces the heater holding member 32. The reinforcing member 36 abuts on the sensor holding member 34 and is fixed thereto with the reinforcing member 36 facing the heater holding member 32 via the sensor holding member 34. The reinforcing member 36 is a stay made of metal with an inverted U-shaped section extending along the direction of the second rotation axis A2.

Figure 2:
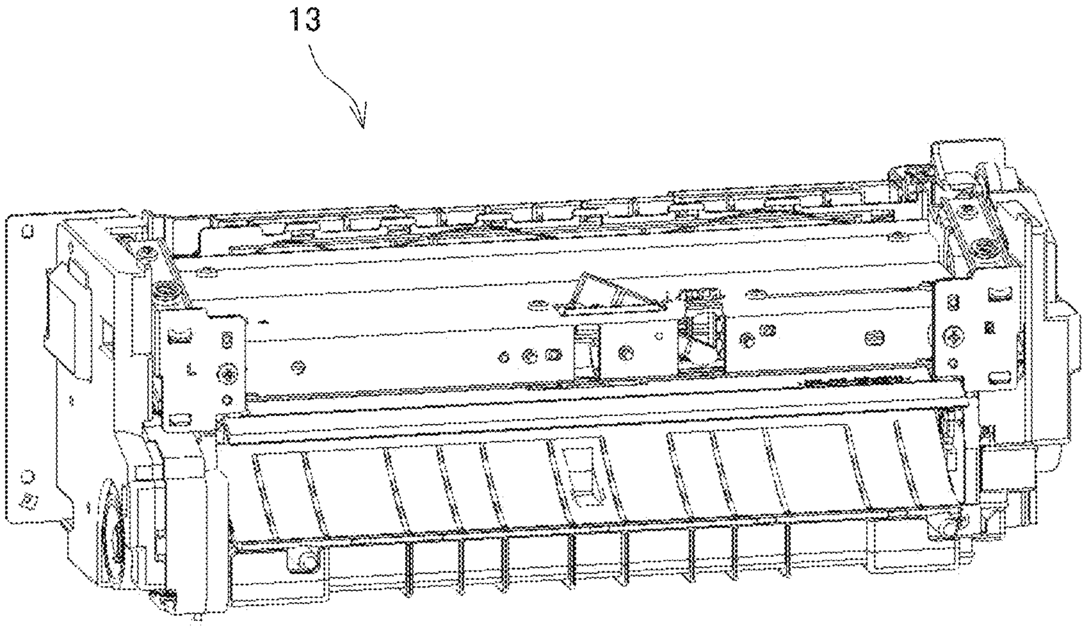
FIG. 2 is a perspective view illustrating an appearance of the fixing device.
Figure 3A:
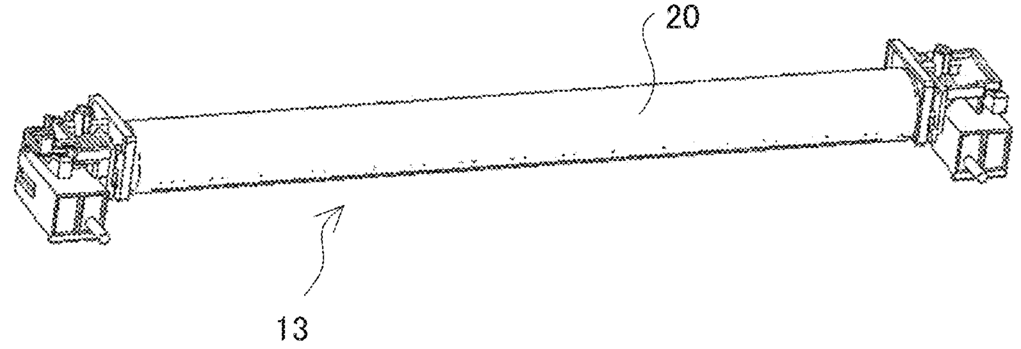
FIGS. 3A and 3B are perspective views illustrating a part of a structure of the fixing device.
Figure 3B:
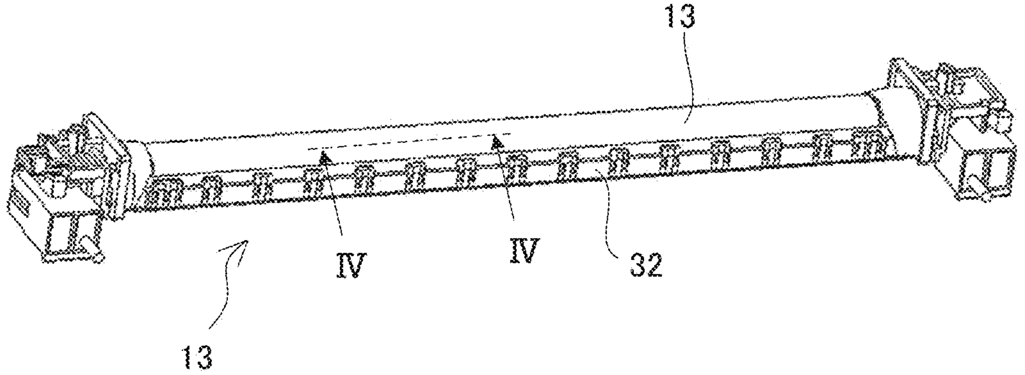
Figure 3C:
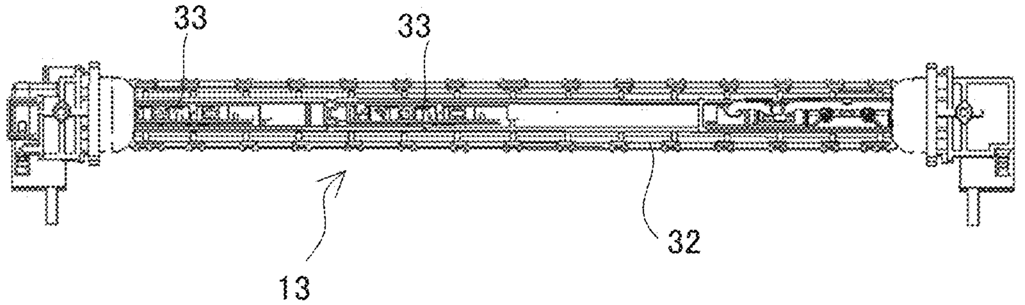
FIG. 3C is a plan view illustrating a part of the structure of the fixing device.
Figure 4A:
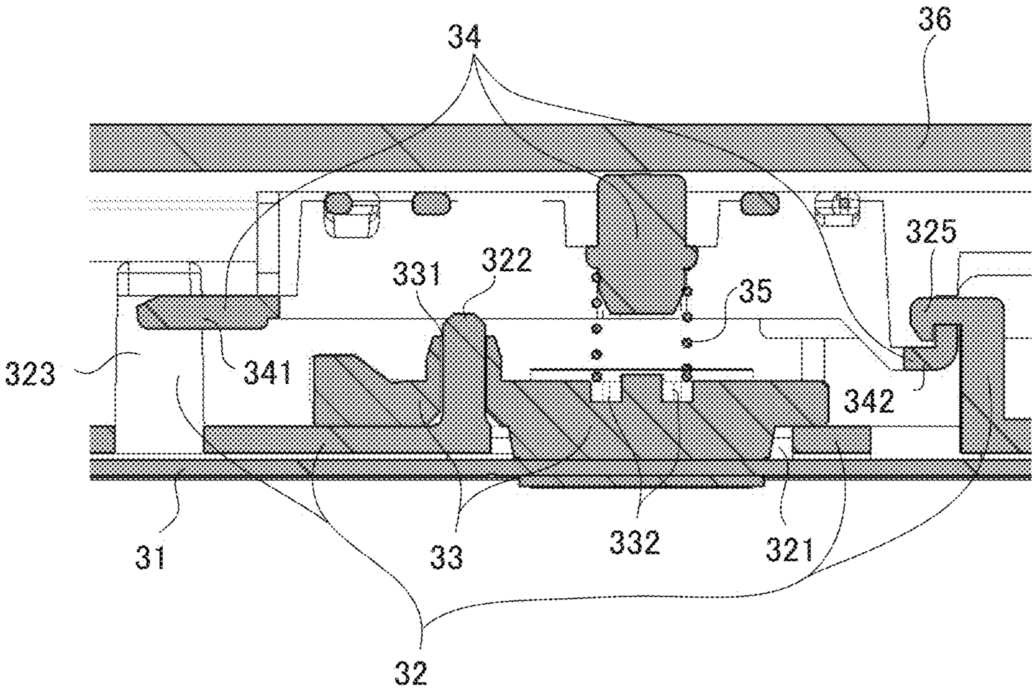
FIG. 4A is a sectional view seen along the arrow of the line IV-IV illustrated in FIG. 3B.
Figure 4B:
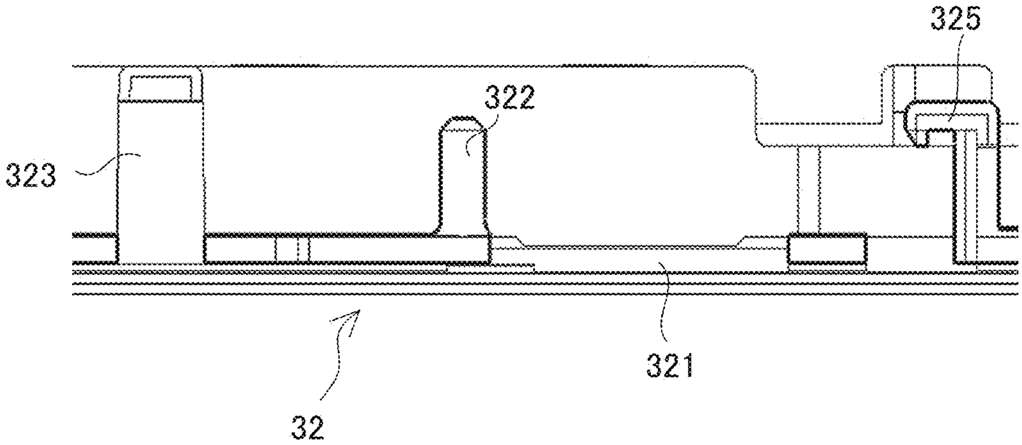
FIG. 4B is a diagram illustrating only a heater holding member in the sectional view illustrated in FIG. 4A.

FIG. 2 is a perspective view illustrating an appearance of the fixing device 13. FIGS. 3A and 3B are perspective views illustrating a part of a structure of the fixing device 13. FIG. 3C is a planar view illustrating a part of the structure of the fixing device 13. FIG. 3B illustrates a state where the fixing belt 20 has been detached from the state illustrated in FIG. 3A. FIG. 3C illustrates a state where the reinforcing member 36 and the sensor holding member 34 have been detached from the state illustrated in FIG. 3B. FIG. 4A is a sectional view along the arrow of the line IV-IV illustrated in FIG. 3B. FIG. 4B is a diagram illustrating only the heater holding member 32 in the sectional view illustrated in FIG. 4A.

Figure 5:
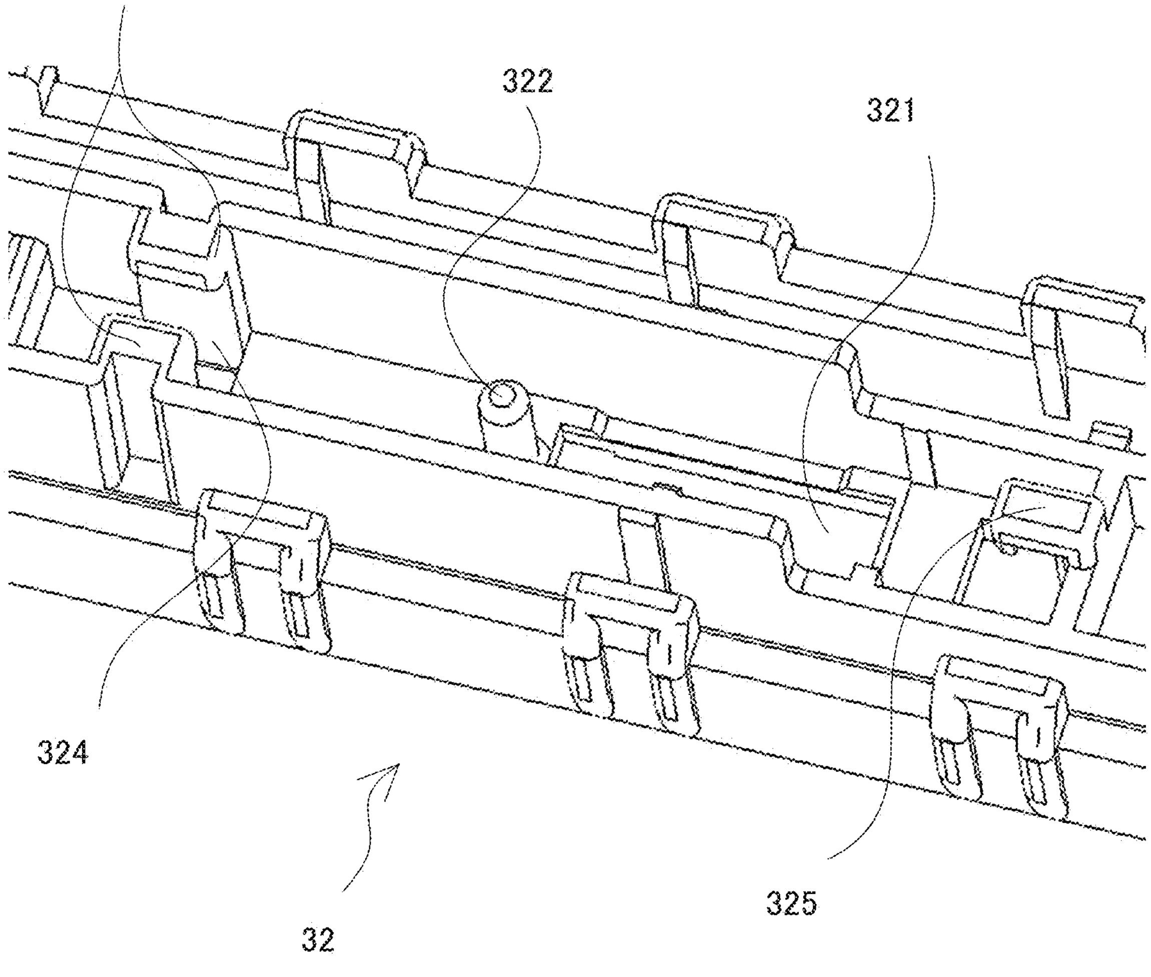
FIG. 5 is a perspective view illustrating the heater holding member.
Figure 6:
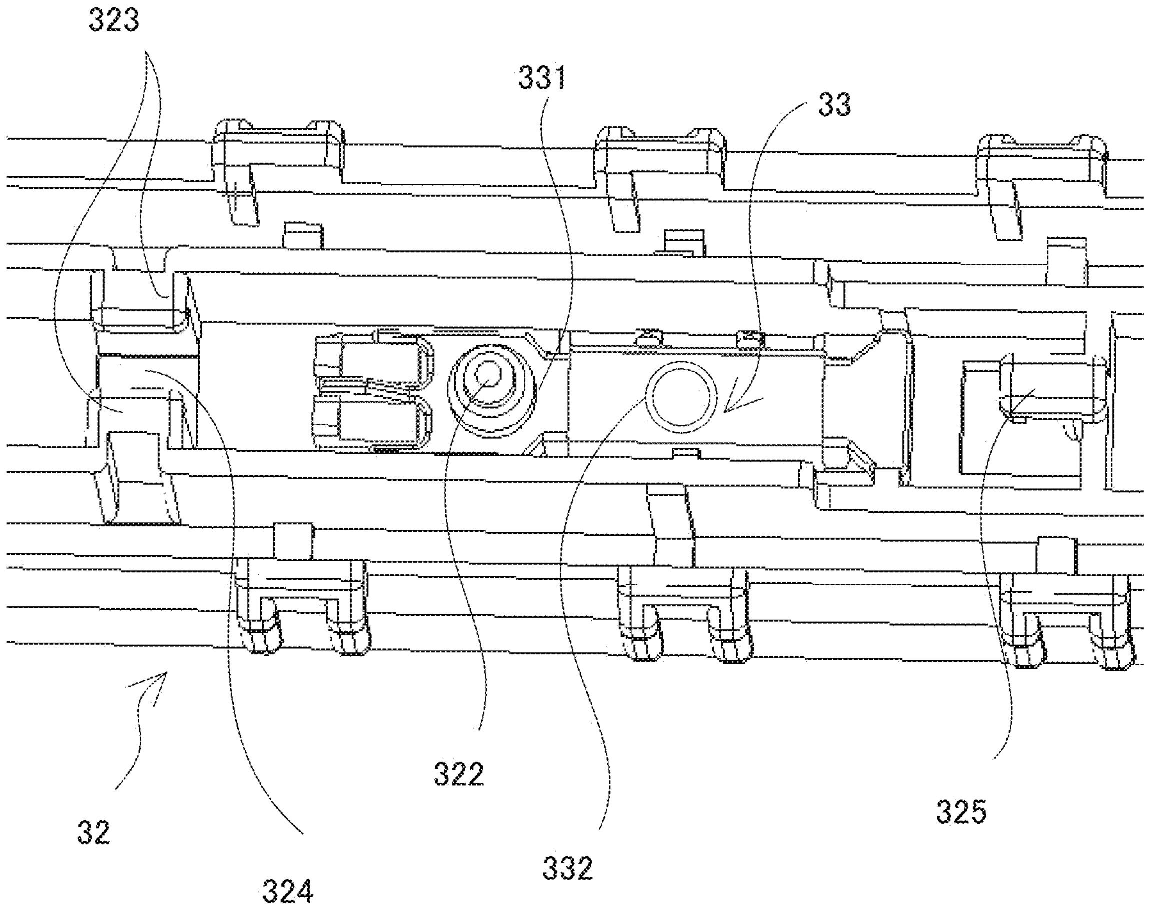
FIG. 6 is a perspective view illustrating a state where a temperature sensor has been attached to the heater holding member.
Figure 7A:
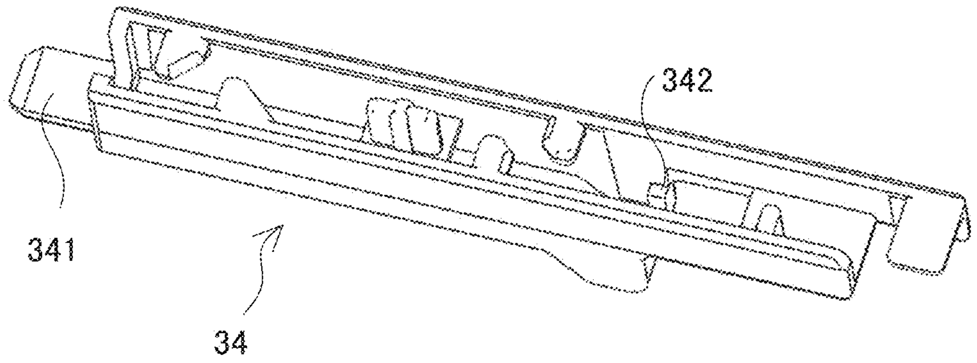
FIG. 7A is a perspective view of a sensor holding member seen from above.
Figure 7B:
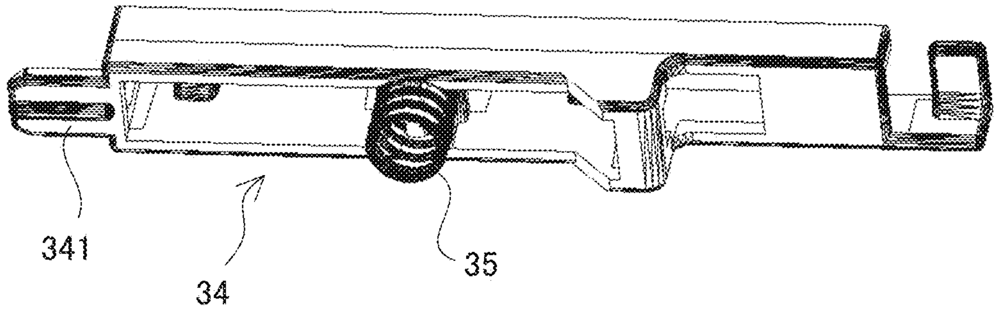
FIG. 7B is a perspective view of the sensor holding member seen from below.

FIG. 5 is a perspective view illustrating the heater holding member 32. FIG. 6 is a perspective view illustrating a state where the temperature sensor 33 has been attached to the heater holding member 32. FIG. 7A is a perspective view of the sensor holding member 34 seen from above. FIG. 7B is a perspective view of the sensor holding member 34 seen from below.

The heater 31 is attached to a lower surface of the heater holding member 32. A penetrating port 321 that allows a part of the temperature sensor 33 to penetrate therethrough and bring the temperature sensor 33 into contact with the heater 31 is formed in the heater holding member 32. The heater holding member 32 includes a positioning pin 322 to position the temperature sensor 33. A through-hole 331 that enables the positioning pin 322 to penetrate therethrough is formed in the temperature sensor 33.

A groove 332 that receives one end of the coil spring as the biasing member 35 is formed in a surface of the temperature sensor 33 facing the sensor holding member 34. The biasing member 35 is positioned relative to the temperature sensor 33 by the one end of the coil spring being fitted into the groove 332.

The heater holding member 32 includes a locking portion 323. The locking portion 323 is configured of a pair of projecting members with upper ends in FIG. 5 bent inward as illustrated in FIG. 5. A narrow width portion 341 with a narrower width than an opening 324 formed by the pair of projecting members is inserted into the opening 324.

The locking portion 323 receives one end (narrow width portion 341) in a length direction of the sensor holding member 34 disposed in the vicinity of the heater holding member 32, locks the one end, and restricts movement of the sensor holding member 34 in a direction spaced apart from the heater holding member 32. The locking portion 323 allows movement of the sensor holding member 34 in a length direction of the heater holding member 32.

The heater holding member 32 includes an engaged portion 325 at a position different from that of the locking portion 323 in the length direction of the heater holding member 32. The engaged portion 325 is engaged with an engaging portion 342 of the sensor holding member 34 when the sensor holding member 34 moves in the length direction in the state where the one end of the sensor holding member 34 is locked by the locking portion 323. In this manner, the engaged portion 325 receives, by the engaging portion 342, the sensor holding member 34 pressurized by a counterreaction of the biasing performed by the biasing member 35 on the temperature sensor 33.

The sensor holding member 34 includes the engaging portion 342 that engages with the engaged portion 325 as described above. The engaging portion 342 is provided at a position different from that of the one end in the length direction of the sensor holding member 34 in the sensor holding member 34. In other words, the engaging portion 342 is provided at a position where the engaging portion 342 can engage with the engaged portion 325 in the state where the one end of the sensor holding member 34 is locked by the locking portion 323.

Figure 8:
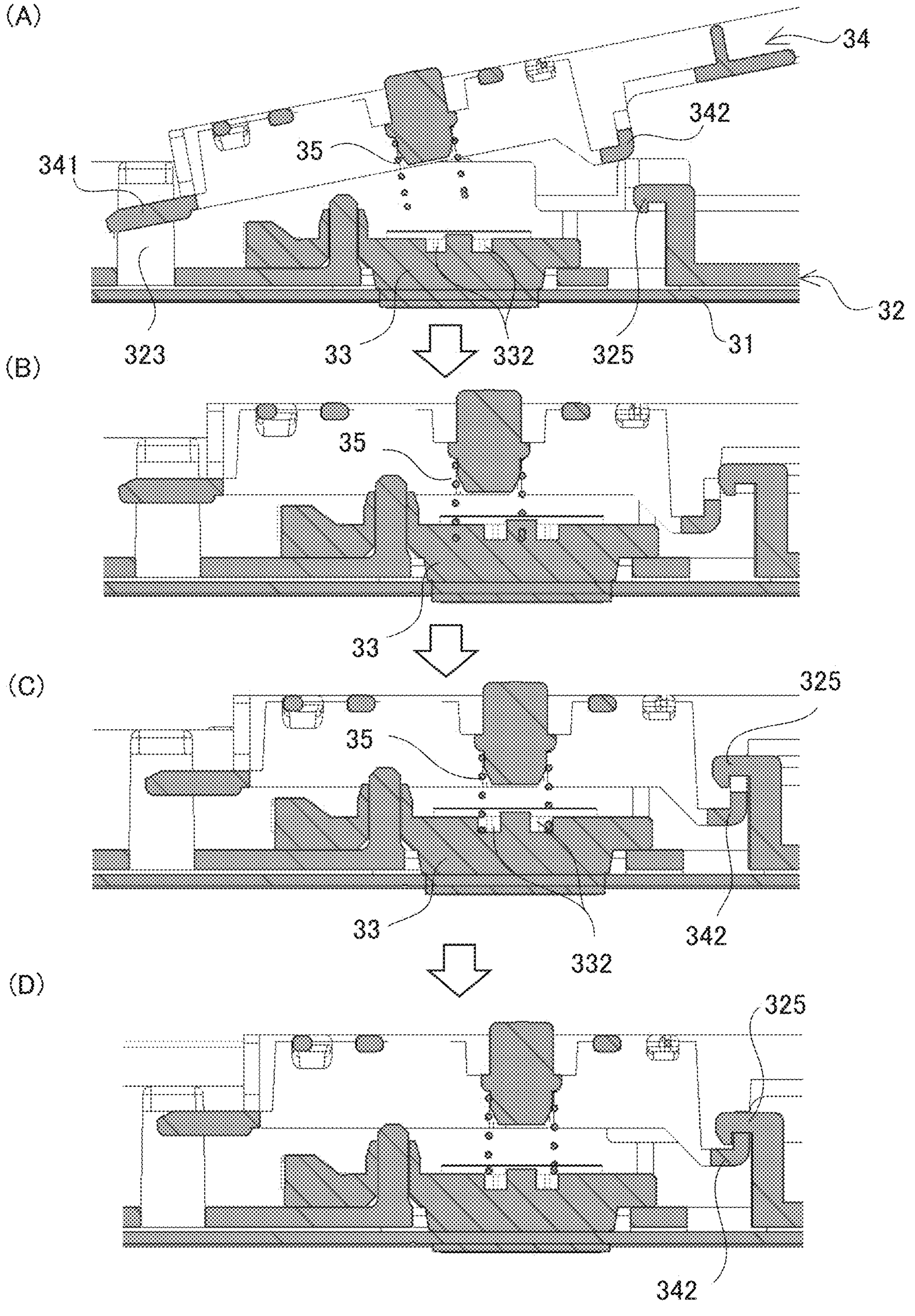
FIG. 8 is a diagram illustrating a work process of attaching the sensor holding member to the heater holding member.

Next, a work process of attaching the sensor holding member 34 to the heater holding member 32 will be described. FIG. 8 is a diagram illustrating the work process of attaching the sensor holding member 34 to the heater holding member 32. As illustrated in FIG. 8A, an operator inserts the one end (narrow width portion 341) of the sensor holding member 34 into the opening 324 (FIGS. 5 and 6) of the locking portion 323.

Figure 9A:
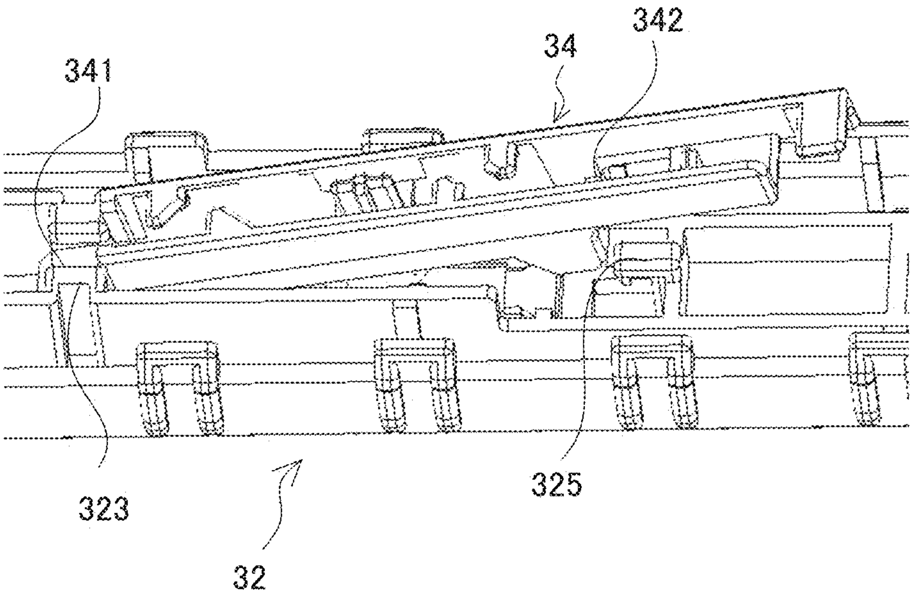
FIG. 9A is a perspective view illustrating a state in the course of attaching the sensor holding member to the heater holding member.

In this manner, movement of the sensor holding member 34 in the direction spaced apart from the heater holding member 32 is restricted. FIG. 9A illustrates, as a perspective view, a state where the one end (narrow width portion 341) of the sensor holding member 34 is inserted into the opening 324 of the locking portion 323.

Subsequently, the operator causes the other end of the sensor holding member 34 to move downward in the state where the narrow width portion 341 as the one end of the sensor holding member 34 is locked by the locking portion 323, and pushes the sensor holding member 34 against the heater holding member 32 and the temperature sensor 33 by applying a load to the sensor holding member 34 (the biasing member 35) against the biasing force of the biasing member 35, as illustrated in FIG. 8B.

Then, the operator causes the sensor holding member 34 to move rightward (the length direction of the heater holding member 32 and the sensor holding member 34) in FIG. 8, causes one end of the compression spring as the biasing member 35 to match the groove 332, and causes the engaging portion 342 to move up to the position of the engaged portion 325, as illustrated in FIG. 8C.

Figure 9B:
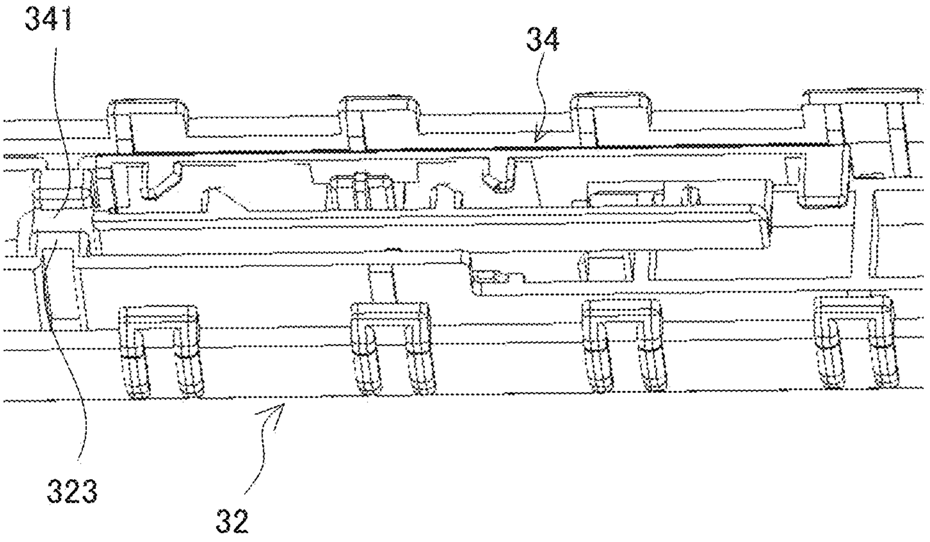
FIG. 9B is a perspective view illustrating a state where the sensor holding member has been attached to the heater holding member.

Once the operator releases the load in the direction of the heater holding member 32 applied to the sensor holding member 34, the engaging portion 342 and the engaged portion 325 are engaged with each other with the biasing force of the biasing member 35 (the counterreaction of the biasing performed by the biasing member 35 on the temperature sensor 33) as illustrated in FIG. 8D, and the engaged state is stably maintained with the biasing force. In this manner, the sensor holding member 34 is attached to the heater holding member 32 as illustrated as an example in FIG. 9B.

Incidentally, in the aforementioned typical fixing device, the heating device includes a heater, a heater holding member that holds the heater, a temperature sensor that is disposed in the heater holding member to face the heater, and a sensor holding member that holds the temperature sensor.

An example of an assembly procedure of the heating device as described above will be described. First, the heater is attached to the heater holding member. The temperature sensor is placed on the heater holding member with the heater attached thereto, and the sensor holding member is placed on the temperature sensor. Then, a reinforcing member made of metal is attached to the heater holding member to reinforce the heater holding member.

However, since the temperature sensor and the sensor holding member are just placed on the heater holding member, there is a problem of unstable assemblability. Therefore, an assemble operator has to perform the assembly work while pressing each member to maintain the positional relationships of the members in a case where the reinforcing member is attached to the heater holding member, for example. The assembly operator also has to use stopper members or the like to maintain the positional relationships of the members, and there is a concern that working efficiency may be degraded.

On the other hand, according to the above embodiment, the sensor holding member 34 is engaged with the heater holding member 32 with the biasing force of the biasing member 35, and movement of the sensor holding member 34 relative to the heater holding member 32 is restricted. Therefore, the engaged state is stably kept, and it is possible to more easily perform the assembly work of the constituting parts with which the heater 31 and the temperature sensor 33 are to be assembled than before. It is thus possible to stabilize the assemblability of the fixing device 13 and to improve efficiency of the assembly work of the fixing device 13.

Also, the reinforcing member 36 abuts on the sensor holding member 34 and is fixed thereto with the reinforcing member 36 facing the heater holding member 32 via the sensor holding member 34. Therefore, it is possible to more stably hold the assembled state between the heater holding member 32 and the sensor holding member 34.

Figure 10:
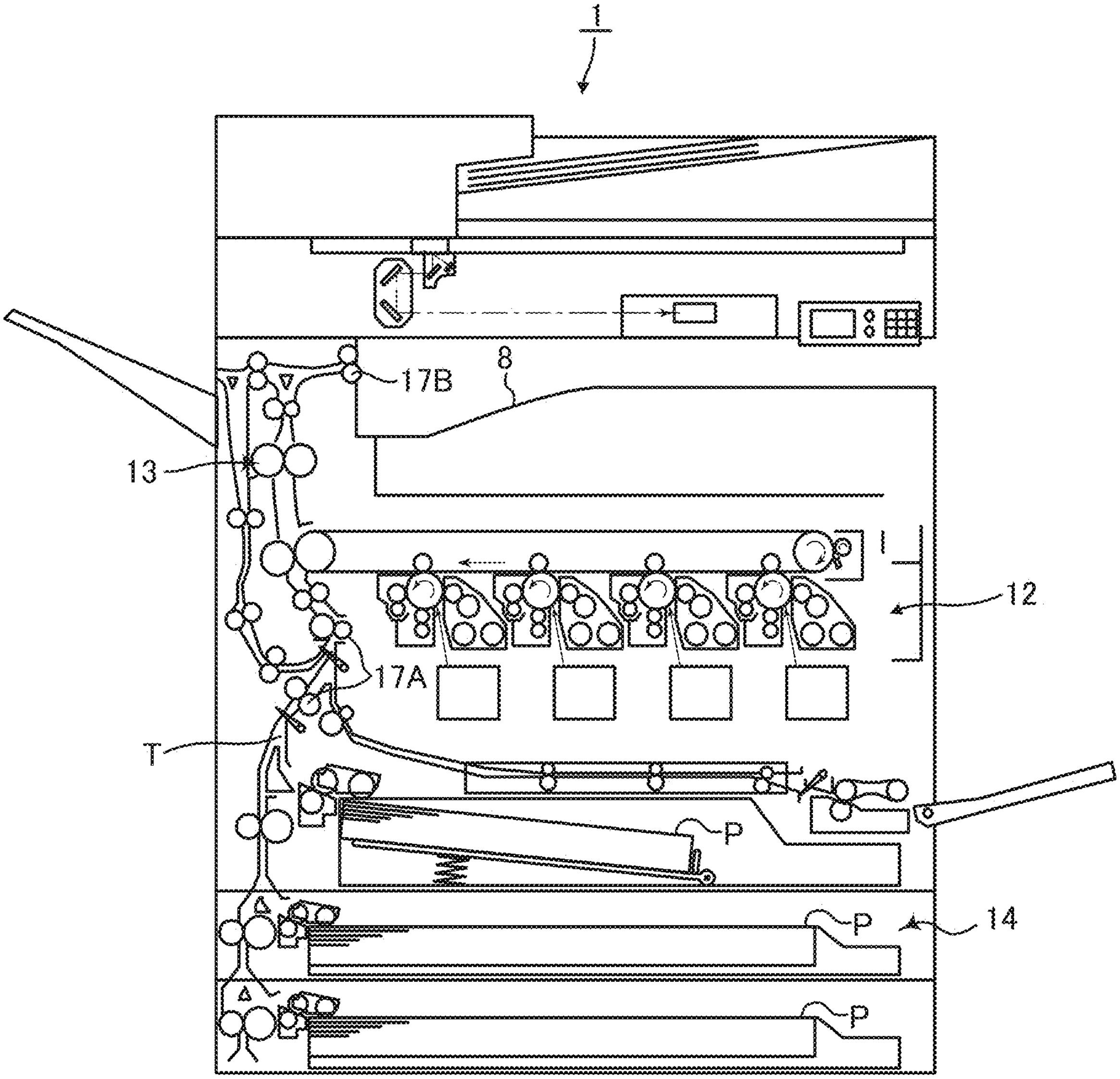
FIG. 10 is a front sectional view illustrating a structure of an image forming apparatus including the fixing device according to an embodiment of the present disclosure.

FIG. 10 is a front sectional view illustrating a structure of an image forming apparatus 1 including the fixing device 13. The image forming apparatus 1 is a multifunction machine having a plurality of functions such as a copy function, a printer function, a scanner function, and a facsimile function, for example.

Referring to FIG. 10, the image forming apparatus 1 includes an image forming device 12, a fixing device 13, sheet supply device 14, a transport roller pair 17A, discharge roller pair 17B, and the like.

The image forming device 12 includes a photoreceptor drum, a charging device, an exposure device, a development device, and a transfer device. The image forming device 12 forms a toner image on a paper P transported along a transport path T by the transport roller pair 17A on the basis of image data.

The fixing device 13 causes the toner image to be fixed to the paper P by heating and pressurizing the paper P with the toner image formed thereon. The paper P with the toner image fixed thereto and with the image formed thereon is discharged to a discharge tray 8 by the discharge roller pair 17B.

The sheet supply device 14 includes a manual insertion tray and a plurality of sheet supply cassettes. The sheet supply device 14 draws the paper P accommodated in any of the plurality of sheet supply cassettes or paper placed on the manual insertion tray one by one by a pickup roller and supplies the paper to the transport path T. Note that the paper P is not limited to a paper medium and may be an overhead projector (OHP) sheet, for example.

The present disclosure is not limited to the configuration of the above embodiment and can be modified in various manners. Also, the configuration and the processing of the above embodiment described using FIGS. 1 to 10 are merely an embodiment of the present disclosure, and there is no intension of limiting the present disclosure to the configuration and the processing.

While the present disclosure has been described in detail with reference to the embodiments thereof, it would be apparent to those skilled in the art the various changes and modifications may be made therein within the scope defined by the appended claims.

What is claimed is:

1. A fixing device comprising:

a tubular and rotatable fixing belt;

a heating device that includes a heater configured to heat the fixing belt and faces an inner peripheral surface of the fixing belt; and a pressurizing member that sandwiches the fixing belt with the heater, forms a fixing nip portion, in which a recording medium is sandwiched and transported, between the pressurizing member and the fixing belt, and causes the fixing belt to be driven and rotated, wherein the heating device includes a heater holding member that holds the heater, a temperature sensor that faces the heater and is disposed in the heater holding member, and a sensor holding member that is assembled with the heater holding member in which the temperature sensor is disposed in a direction in which the sensor holding member faces the temperature sensor, the sensor holding member includes a biasing member that faces the heater holding member via the temperature sensor and biases the temperature sensor in a first direction directed from the temperature sensor to the heater, and the heater holding member includes:

a locking portion that includes a pair of projecting members whose end portions on a side in the second direction opposite to the first direction are bent in directions toward each other to form an opening; and an engaged portion having a recess that is open to the first direction and provided at a position different from that of the locking portion in a longitudinal direction of the heater holding member, a width of the one end portion of the sensor holding member in the longitudinal direction is formed to be smaller than the opening, a convex portion projecting toward the second direction is formed on a side of the other end of the sensor holding member in the longitudinal direction, the one end portion of the sensor holding member is locked by being inserted into the opening, and in a state in which the one end portion of the sensor holding member is locked to the locking portion, the sensor holding member is loaded in the first direction against a biasing force of the biasing member and is moved in the longitudinal direction until the convex portion of the sensor holding member is positioned on a first direction side of the recess of the heater holding member, and upon release of the load, the convex portion and the recess become engaged by the biasing force of the biasing member.

2. The fixing device according to claim 1, wherein the biasing member is a compression spring, and a groove that receives one end of the compression spring is formed in a surface of the temperature sensor facing the sensor holding member in a state where the temperature sensor is disposed in the heater holding member.

3. The fixing device according to claim 1, wherein the heating device further includes a reinforcing member that abuts on the sensor holding member and is fixed to the sensor holding member with the reinforcing member facing the heater holding member via the sensor holding member.

4. An image forming apparatus comprising:

the fixing device according to claim 1; and an image forming device that forms an image on a recording medium, wherein the fixing device causes the image formed on the recording medium by the image forming device to be fixed.

* * * * *